United States Patent
Theobald et al.

(10) Patent No.: US 8,567,185 B1
(45) Date of Patent: Oct. 29, 2013

(54) HIGH EFFICIENCY ACTUATOR METHOD, SYSTEM AND APPARATUS

(75) Inventors: Daniel Theobald, Sommerville, MA (US); Andreas Hofmann, East Boston, MA (US)

(73) Assignee: Vecna Technologies, Inc., Cambridge, MA (US)

( * ) Notice: Subject to any disclaimer, the term of this patent is extended or adjusted under 35 U.S.C. 154(b) by 927 days.

(21) Appl. No.: 12/705,995

(22) Filed: Feb. 16, 2010

(51) Int. Cl.
*B25J 9/00* (2006.01)

(52) U.S. Cl.
USPC .............................................. 60/413; 901/22

(58) Field of Classification Search
USPC .......... 60/413, 422, 452, 462; 91/423; 901/22
See application file for complete search history.

(56) References Cited

U.S. PATENT DOCUMENTS

| | | | | | |
|---|---|---|---|---|---|
| 3,902,318 | A | * | 9/1975 | Becker et al. | 60/444 |
| 4,356,554 | A | * | 10/1982 | Susnjara et al. | 901/22 |
| 4,565,487 | A | * | 1/1986 | Kroczynski | 901/22 |
| 4,667,475 | A | * | 5/1987 | Wesman | 901/22 |
| 4,683,773 | A | * | 8/1987 | Diamond | 901/21 |
| 4,959,958 | A | * | 10/1990 | Nishikawa et al. | 60/415 |
| 5,121,805 | A | * | 6/1992 | Collie | 180/8.1 |
| 5,351,602 | A | * | 10/1994 | Monroe | 60/413 |
| 5,680,760 | A | * | 10/1997 | Lunzman | 60/452 |
| 5,682,923 | A | * | 11/1997 | Goloff et al. | 138/30 |
| 5,739,655 | A | * | 4/1998 | Torii et al. | 318/568.12 |
| 6,193,002 | B1 | * | 2/2001 | Paakkunainen | 180/8.1 |
| 6,446,433 | B1 | * | 9/2002 | Holt et al. | 60/433 |
| 6,532,400 | B1 | * | 3/2003 | Jacobs | 901/34 |
| 6,732,512 | B2 | * | 5/2004 | Pfaff et al. | 60/452 |
| 7,498,758 | B2 | * | 3/2009 | Baba et al. | 901/22 |
| 8,126,592 | B2 | * | 2/2012 | Saunders et al. | 901/9 |
| 2005/0283043 | A1 | * | 12/2005 | Sisk | 600/38 |
| 2010/0270771 | A1 | * | 10/2010 | Kobayashi et al. | 280/210 |

* cited by examiner

*Primary Examiner* — Thomas E Lazo
(74) *Attorney, Agent, or Firm* — Albert J. Brunett

(57) ABSTRACT

A method, system and apparatus including a mechanism capable of performing a variety of operations, each operation having a respective power requirement and a power source capable of providing power to the mechanism at a variety of different levels corresponding to the operations being undertaken by the mechanism where the power source is regulated to at least provide a first lower power level sufficient for one or more operations requiring a lower power level and is increased to provide a higher power level as needed for one or more alternative operations requiring a higher power level.

3 Claims, 3 Drawing Sheets

HIGH EFFICIENCY ACTUATOR METHOD, SYSTEM AND APPARATUS

CROSS-REFERENCE TO RELATED APPLICATIONS

This application is related to U.S. patent application entitled "Passive Impedance Control for an Actuator", Ser. No. 12/705,993 which is assigned to the same assignee as the assignee herein, filed concurrently herewith and hereby incorporated by reference.

FIELD OF THE INVENTION

The present invention relates generally to mechanical systems, and more particularly to mechanical systems utilizing actuators.

BACKGROUND OF THE INVENTION

Actuators typically are mechanical devices that are used for moving or controlling a mechanism or system and typically convert energy into some type of motion. Examples of actuators can be found in any number of applications encountered in every day life including automotive, aviation, construction, farming, factories, robots, health care, and prosthetics, among other areas.

Every mechanical system designed to move or control a mechanism or system must have one or more "prime movers" to provide the work needed and one or more "transmissions" to convey the work from the prime mover to the object that is desired to be moved. Prime movers typically convert electrical or chemical energy to mechanical energy in the form of forces and displacements.

Examples of prime movers may include combustion engines, electric motors, biological/artificial muscles, piezo-electrics, shape-memory-alloys, magnetostrictives and dielectrics, among others. Examples of transmissions may include levers, linkages, wheels, gears, pneumatics and hydraulics, among others.

Hydraulic systems are generally known and typically include an actuator and one or more valves in fluid communication with a pump that provides fluid to the system at a fixed pressure. Such systems tend to be very inefficient, costly and noisy. This is particularly true in hydraulic systems that rely on "throttling" of fluid through a valve to provide control in the system where fluid is transitioned from high to low pressure without extracting the energy as useful work but instead wasting that energy primarily in the form of heat.

Compliant control or impedance control is sometimes desirable in mechanical devices to provide an amount of "give" or reduced stiffness in the operation of the device. Existing active compliance control systems, however, typically require expending additional energy to reduce operational stiffness which is undesirable in most if not all applications.

SUMMARY OF THE INVENTION

A method, system and apparatus including a mechanism capable of performing a variety of operations, each operation having a respective power requirement and a power source capable of providing power to the mechanism at a variety of different levels corresponding to the operations being undertaken by the mechanism where the power source is regulated to at least provide a first lower power level sufficient for one or more operations requiring a lower power level and is increased to provide a higher power level as needed for one or more alternative operations requiring a higher power level.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DETAILED DESCRIPTION OF THE INVENTION

Figure 1:
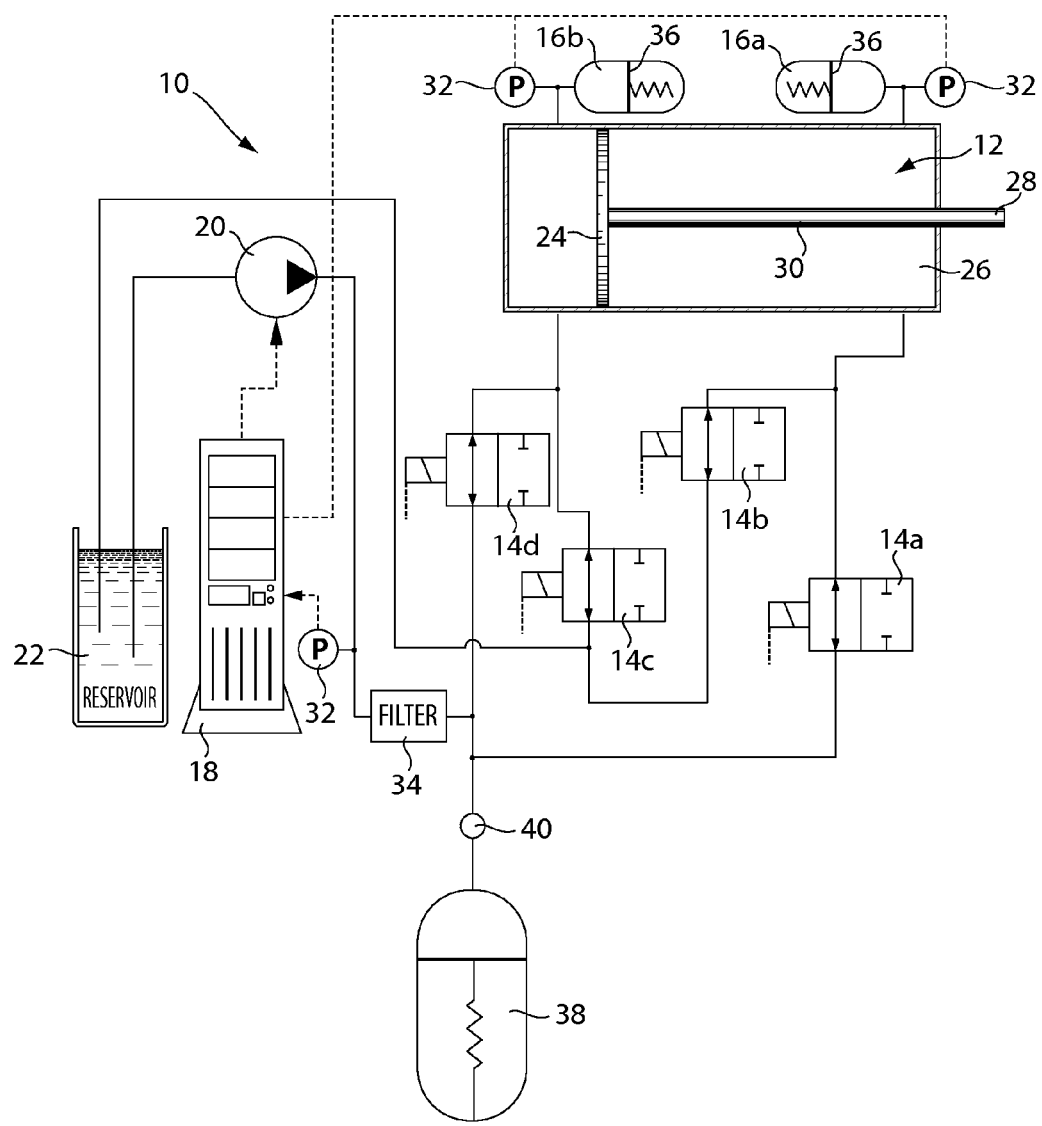
FIG. 1 is a schematic view of one embodiment of an actuator system of the present invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

The present invention is directed to smart hydraulic actuators (SHAs), a term coined by applicants that achieve shock absorption and energy efficiencies, among other features, with superior controllability using novel integrated valves, pressure sensors, accumulators, computer controlled pumps and advanced control algorithms as described in detail herein. Such a system can provide a hydraulic or pneumatic system with more than many times the power density of non-hydraulic or pneumatic systems while achieving the same or even better efficiency. Since hydraulic systems typically are very inefficient with the majority of energy being wasted, providing a hydraulic system having an efficiency equal to or greater than other systems, such as systems having electric motors, is an incredible, novel advance in the art.

In an electronic system, for example, the weight of the individual motors, batteries and transmissions is very high while the power output is low thereby providing a low power density. In a system that requires multiple motors, batteries and transmissions, such as a robot where each joint typically has such a requirement, the power density is even less.

In a pneumatic system, the compressibility of air provides another variable that may be somewhat harder to control, particularly when fine motor control is needed. The success of such systems can depend on the load to be lifted where low loads may be readily accommodated but for higher loads the compressibility of air becomes more of a factor and fine motion control is more difficult.

Robots typically are only capable of the lightest of labor due primarily to the poor power density achievable in high degree of freedom systems having many joints where a separate motor or prime mover is used for each joint. The present invention enables many times improvement in power density by using a transmission system, such as a hydraulic or pneumatic system for example, that allows one prime mover to provide power to many joints at the same time.

In use, rarely, if ever, does a robot need to use all its joints at full power at the same time. Thus, the present invention provides an opportunity to share a prime mover among several joints by using a transmission that can split and transmit the work provided by the primer mover to several joints as needed.

The present invention also allows for energy recapture, as described below, thereby providing additional energy savings in a variety of applications such as robotics, automotive, aviation and construction, among other areas. Systems that provide for energy recapture are of most interest in today's environment since they can reduce energy consumption thereby providing a "green" alternative to traditional systems.

FIG. 1 illustrates one embodiment of the system of the present invention that is generally illustrated by the reference numeral 10 utilized in conjunction with a hydraulic application. The main components of the system 10 include an actuator 12, a plurality of valves 14a-14d, two accumulators 16a and 16b, a CPU or other computing device or the like 18, a computer controllable variable output pump 20 and a fluid reservoir 22. Although the system 10 in this embodiment is illustrated with regard to a hydraulic application, it is to be understood that the system 10 can be employed with other non-hydraulic applications if desired and the particular components used as well as the number and position of those components may vary so long as they fall within the scope of the appended claims.

As mentioned above, an actuator typically is some type of mechanical device used for moving or controlling a mechanism or system and typically converts energy into some type of motion. Examples of actuators can be found in any number of applications encountered in every day life including automotive, aviation, construction, farming, factories, robots, health care, and prosthetics, among other areas.

Although designs may vary, a hydraulic or pneumatic actuator typically takes the form of actuator 12 where a piston 24 is positioned within a cylinder or chamber 26 with the end 28 of a connecting rod 30 of the piston 24 extending to the outside of the chamber 26. The piston 24 is moved back and forth within the chamber 26 so that the rod end 28 can contact various members external to the actuator 12 (not illustrated) to provide the desired effect.

One example of the use of such an actuator 12 would be in robotics (not illustrated) where the rod end 28 typically is connected to another member, say for an arm joint or other type of structure. By moving the rod end 28 back and forth the robot arm can be raised and lowered a desired amount. Complex mobile robots can have dozens of actuators 12 used to provide various motions to the robot. The system 10 of the present invention, when utilized with a complex robot or the like, enables a plurality of actuators 12 to be controlled by the same hydraulic fluid and control system thereby reducing the number of components and overall weight, among other benefits, and providing uses that previously have been at least impractical if not impossible.

A number of pressure sensors 32 can be employed at various points within the system 10, each sensor 32 being connected to the CPU 18. A filter 34 may also be included if desired.

Figure 2:
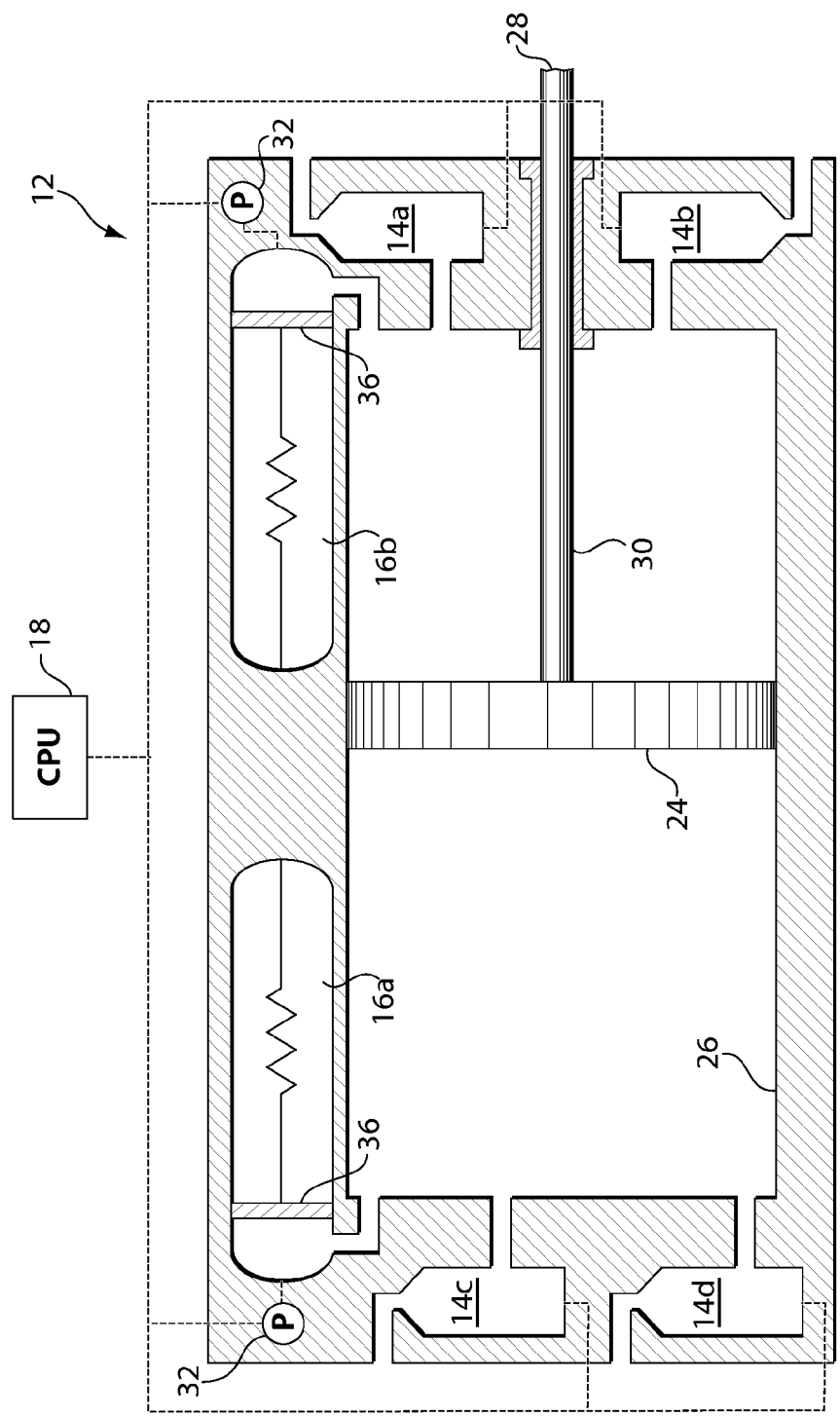
FIG. 2 is a cross-sectional view of one embodiment of the present invention illustrating an actuator member with associated computer controlled valves, accumulators and sensors.

FIG. 2 illustrates one embodiment of the actuator 12 of the present invention designed as a single component having at least the valves 14a-14d, accumulators 16a and 16b and sensors 32 integrally formed with the actuator 12 as one member and in communication with the CPU 18. This arrangement, which readily may vary, provides additional efficiencies to the system 10 as will be described in more detail below. It is to be noted that the location and construction of accumulators 16 and valves 14 can vary widely and a compressible working fluid may be utilized with the teachings of the present invention.

The valves 14a-14d preferably are small, efficient valves that can be of any design so long as they accomplish their intended task. Although poppet valves have been used with success in testing, any other valve may be utilized without departing from the teachings of the present invention.

The accumulators 16a and 16b preferably are "passive" accumulators that enable the desired impedance or compliance control of the system 10 without requiring any additional energy from the system 10. The accumulators 16a and 16b also provide energy recovery as described in more detail below and may have a control valve (not illustrated) associated therewith and in communication with the CPU 18. The accumulators 16a and 16b are illustrated being in the form of a spring biased piston 36, but the design of the accumulators 16b and 16b can vary so long as they provide the intended function as described herein.

The CPU 18 can be any desired type of CPU so long as it can execute the software and novel algorithms necessary to monitor and control the system 10 as desired. The pump 20 preferably is a variable pressure pump, such as an electric variable pressure pump, that can be controlled by the CPU 18. The reservoir 22 preferably is selected to perform according to the requirements of the system 10 and typically is a sealed reservoir (not illustrated). It is to be understood, however, that the size, type and design of the CPU 18, pump 20 and reservoir 22 can vary without departing from the teachings of the present invention.

The smart system 10 of the present invention relies on at least three key design modifications to provide the unique features of the present invention. First, rather than running the pump 20 at a constant high pressure, the pump 20 is only run to provide the pressure needed at the moment and, as much as possible, move few actuators 12 at the same time to reduce throttling losses, if any, among other features.

Second, instead of merely managing the pressure in and out of one side of the actuator 12 only, charge and manage the pressure on each side of the actuator 12 independently. This not only allows for more precise control but enables true passive impedance control, maximizes energy savings and allows for energy recapture.

Passive adjustable impedance is achieved by charging accumulators 16a and 16b on both sides of the actuator 12. The non-linear relation between accumulator charge and external force makes adjustable impedance control possible.

Finally, the control valves 14a-14d in the present invention are positioned as close as possible to the actuator 12 and may be integrally formed with the actuator 12 themselves as illustrated in FIG. 2. This leads to increased responsiveness due to shorter fluid travel distances along with a decrease in piping losses due to friction or the like both of which can be substantial and contribute to "dead-band" (described in more detail below) which prevents precise control of the actuator 12 and severely limits use of hydraulic actuators.

Conventional hydraulic systems (not illustrated) typically are inefficient, large, heavy, noisy and expensive since they tend to emphasize controllability at the sake of these other factors, among others. These over sized, constant maximum-pressure systems tend to provide a pump powerful enough to supply the maximum flow needed for all actuators that might be on at the same time while maintaining the set, very high system pressure to avoid the problem of pressure fluctuations as valves are opened and closed and essentially decouples actuators to simplify control problems.

Although such over sized/max pressure systems may reduce control problems associated with coupling actuators together (i.e. having one system influence more than one actuator 12 as in the present invention) controllability of the individual valves is sacrificed. More particularly, it is more difficult to control fluids at higher pressure differentials. On the other hand, since it's simply easier to control fluids at lower pressure differentials as in the present invention than at higher pressure differentials providing fine motion control is much easier at such lower pressure differentials. In addition, it is relatively harder to control flow with hydraulic valves compared to controlling the flow of fluid with a pump providing an incentive to control fluid flow at the pump as much as possible as in the present invention particularly when fine motion control is needed.

It also is to be noted that coupling multiple actuators to a single source of fluid supply is typically not implemented by existing hydraulic and even pneumatic systems. Existing systems fight to keep the system at a high pressure. There is no interest in coupling actuators in such systems since it would be harder to control these systems. As explained in more detail below, the present invention teaches away from the mainstream thinking by coupling actuators to enjoy several advantages not possible with existing systems.

By running the pump 20 only at the pressure needed at the moment a number of advantages are provided by the present invention. Since the majority of the noise that may be generated by the system 10 typically is provided by the prime mover such as the pump 20, by keeping the pressure lower the pump 20 runs less and contributes less noise.

Additionally, running at a lower pressure more of the time is easier on the overall system 10 including the lifetime of the components of the system 10 and reduces potential leaks since not running at a high pressure all the time. Thus, the system 10 of the present invention addresses noise and leakage that are at least two concerns with hydraulic and sometimes pneumatic systems.

Long hoses or pipes running from valves to actuators limits the responsiveness of the actuator since pressure waves in fluids flow at the speed of sound while the electrical impulse to open or close the valve travels at the speed of light. Positioning the valves as close as possible to the hydraulic cylinders, as in the present invention, increases the response time in addition to reducing the inertial effects (controllability) and frictional losses (efficiency) of the long narrow hoses running between the valves and the cylinders.

Eliminating or at least reducing "dead-band" (areas where no action occurs) in actuators is an important feature of the present invention which enables more precise controllability of the actuators. In systems with any dead-band any type of controllability is significantly reduced if not impossible.

By using valves designed such as a poppet valve, for example, dead-band can be dramatically reduced if not essentially eliminated. In other types of valves, in moving from one state or position to another an intermediate position frequently must be traversed by the valve member which provides significant delays or dead-band in the operation of such valves. As can readily be understood, the more dead-band there is in a valve the less control is provided by a system. It is to be understood, however, that the teachings of the present invention can be implemented with a variety of valves other than poppet valves.

The key modifications of the present invention as noted above, among other modifications, provide the unique features not present in existing systems. The combination of the key modifications and other features of the present invention represent a significant advancement in the art while opening up completely new areas of applications not previously considered due to the problems of such existing systems.

Providing a multitude of states of operation is another important feature of the present invention that contributes to more precise controllability of the actuators. In systems having actuators with only 3 possible states of operation (closed, side one to pressure and side 2 to tank, or side 2 to pressure and side 1 to tank) are quite limited in their controllability and, unlike the system 10 of the present invention, do not provide an opportunity to manage the pressure on both sides of the cylinder at the same time in a variable manner.

Impedance control in systems is also a desirable feature provided by the present invention since it enables some flexibility in the object being manipulated by an actuator. For example, in a robot arm it frequently is desirable to provide the arm with some flexibility, as opposed to being completely stiff, to reduce any damage or injury to objects or beings that may come in contact with the robot arm. Accumulators in a hydraulic system are seen as the equivalent of capacitors in an electronic system.

With the integrated accumulators 16a, 16b and individual valves 14a-14d controlling each side of the piston 24 as illustrated in FIGS. 1 and 2 the present invention will be able to precisely control not only the position of the piston 24 but also the passive compliance of each joint or joints (not illustrated) associated with one or more actuators 12 to provide the desired impedance control. At the same time, dead-band typically from valves will be completely eliminated.

Additionally, the accumulators 16a, 16b of the present invention achieve adjustable "passive" impedance control since it utilizes the physics of compliant elements and accumulators to achieve the desired spring characteristic and requires no additional energy. Passive adjustable impedance is achieved by charging accumulators 16a and 16b on both sides of the actuator 12. The non-linear relation between accumulator charge and external force makes adjustable impedance control possible. Conversely, "active" impedance control approaches typically move the actuators in such a way as to mimic compliance characteristics that may be flexible, but requires high bandwidth control and requires constant injection of energy to move the actuators.

The system 10 of the present invention also enables a form of active impedance control by at least manipulating the appropriate valves 14a-14d to allow the fluid to flow to other parts of the system 10, including both sides of the piston 24 of the actuator 12. As described in more detail below, this form of active impedance can be combined with passive impedance to enhance shock absorption, among other benefits.

Figure 3:
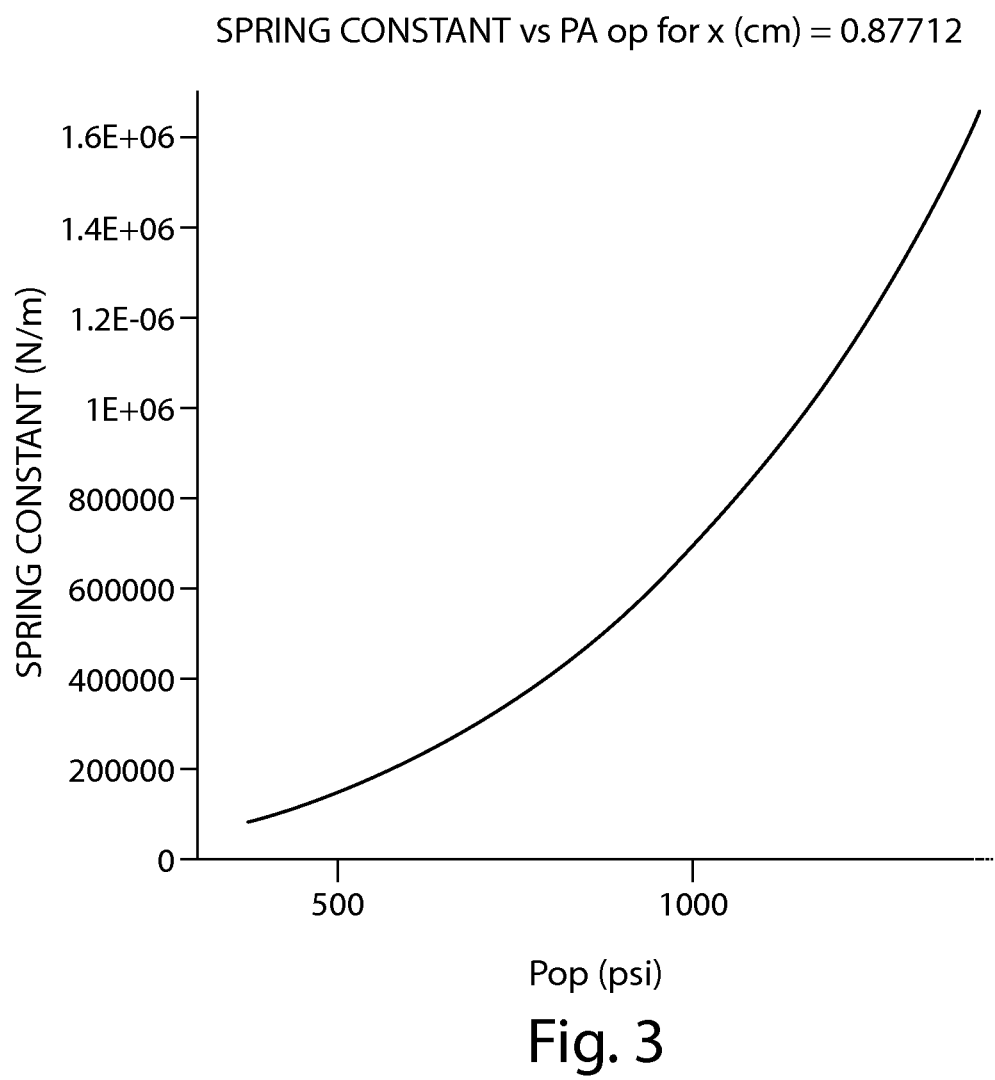
FIG. 3 is one of many potential graphs illustrating one range of possible spring constants achievable with the present invention given particular values of the system components, among other components and values.

A number of tests have been performed to evaluate the use of the accumulators 16a, 16b of the present invention to achieve the desired adjustable passive impedance control. In these tests, the accumulators 16a, 16b were connected as illustrated in FIG. 1 and the cylinder 26 pressure was set independently on either side of the piston of the actuator 12. An external load (not illustrated) was applied to the actuator 12 resulting in a displacement of the actuator 12. By measuring the displacement of the actuator 12 from the load as well as the load itself, the spring constant for a particular charge pressure was determined as illustrated in FIG. 3. The results of this testing illustrate that a wide range of passive compliance can be achieved with the actuator 12 of the present invention.

It is to be noted that when the system 10 of the present invention is used to move a member, such as a robot arm, for example, the robot arm can move in free space and can be somewhat "floppy" as opposed to a completely rigid robot arm. This is very important in robotic and other applications where the system may be exposed to some type of impact either from the movement of the robot arm or from an external object or projectile that may hit the robot arm or similar member.

Generally speaking, hydraulic fluid is relatively stiff and a piston rod of an actuator typically is rigidly attached to another member, such as a robot arm or leg, for example. If such an arm is subjected to an impact, a spike in the pressure of the system can cause a leak, break the piston or cause damage to other system components.

In the present invention, the pressure spike provided by an impact is reduced or eliminated before it can cause a leak or damage to the components of the system 10. This is accomplished by enabling at least the accumulators 16a and 16b to passively store the energy from the pressure spike. In situations where the pressure spike may be quite large, the accumulators 16a and 16b spread out the pressure event and buy a fractional amount of time to enable the system 10 to provide additional passive or active impedance control and absorb and/or store the larger pressure spike.

Thus, the accumulators 16a and 16b enable the system 10 to absorb a higher displacement of the piston 24 of the actuator 12 in nano-seconds without damaging the components of the system 10. The accumulators 16a and 16b preferably are designed to be large enough to enable enough time to allow the system 10 to switch from passive impedance provided by the accumulators 16a and 16b to active impedance provided by the valves 14a-14d.

When hydraulic fluid transitions from a high pressure to a lower pressure (such as through a valve, orifice or the like) without extracting the energy as useful work, the energy is wasted as heat. This transition is known as "trotttling" and creates substantial inefficiencies and should be avoided whenever possible when energy efficiency is important.

As an example, when a hydraulic system is used to raise objects of various weights the system fluid pressure may be maintained at 500 psi or more selected in anticipation of the maximum load or weight the system may be required to move. When the weight being lifted is approximately equal to the system pressure, only minimal fluid energy is lost to heat.

In contrast, when the weight being lifted is less than the system pressure a substantial amount of the fluid energy is lost to heat, typically from throttling, whereby substantially more total energy is used than is necessary to lift the lighter weight. In many applications using ten times more energy (or higher) than is necessary to lift the lighter weight is typical.

Since this excessive energy is in the form of heat, the heat can build up quickly and must be adequately dissipated to avoid affecting system performance or failure. Traditionally, dissipating heat is achieved by providing a large fluid reservoir that enables the fluid to cool down. Providing large fluid reservoirs for cooling is not possible in many applications, such as mobile robotics, and has severely limited the use of hydraulics in many environments that could benefit from the advantages of hydraulics.

Energy inefficiencies also exist in traditional hydraulic applications due to friction in small diameter fluid lines or pipes that typically have long lengths joining the fluid reservoir to the valves and back. It readily can be shown that for every extra inch or length of a 3/16" diameter pipe or hose an additional 8 watts of fluid pumping power is required that can lead to the loss of over 1300 watts just in piping losses for a complex hydraulic system.

When a transmission system, such as a hydraulic system or the like, is actuated to lift an object say off the ground to a particular height a portion of the energy used to lift the object is converted to gravitational potential energy now stored in the object just lifted. If the system has a 50% efficiency rating, essentially half of the energy was wasted, likely as heat, and half is still stored as potential energy in the object.

When the system is actuated to later set the object back down on the ground, it stands to reason that the system should expend less energy to do so. In most systems, however, particularly hydraulic systems, it typically takes just as much energy to place the object down as it did to lift it up since pressure alone is used to both raise and lower the object without being able to take advantage of the gravitational potential energy stored in the object.

Due to the unique arrangement of the system 10 of the present invention, recapturing this gravitational potential energy can be accomplished. The smart control system 10 and valve arrangement of the present invention, among other features, can independently connect either side of the hydraulic cylinder 26 to either pressure or tank/reservoir 22 to create the possibility of energy recapture. For example, the system 10 can connect both sides of the cylinder 26 or actuator 12 to tank/reservoir 22 allowing gravity to pull the object down while the cylinder 26 acts as damper to control the rate of fall of the object.

The system 10 can also connect both sides of the cylinder 26 or actuator 12 to pressure from the pump 20 which, depending on the orientation of the cylinder 26, will either waste a little energy than gravity would pull the object down on its own or instead recapture energy by forcing some of the high pressure hydraulic fluid back into other parts of the system 10. Finally, the system 10 can connect one side of the cylinder 26 or actuator 12 to pressure and one side to tank/reservoir 22 thereby pushing the complete volume of fluid back into the high pressure system 10.

Variables with these operations include how fast the object is to be moved, the current system pressure and whether one or more joints are operating at the same time that could make immediate use of the high pressure fluid, among other variables.

As FIG. 1 illustrates, the system 10 of the present invention may also provide additional energy recovery and storage capabilities by including one or more additional central accumulators 38. The accumulator 38 may preferably include valve 40 that can be controlled by the CPU 18.

When an actuator 12 is used to move another member, such as a robot arm, for example, the arm can be susceptible to impact as described above. On impact of the arm from another object, the piston 24 in the actuator 12 acts like a pump and puts pressure in the system 10.

When this occurs, the valve 40 can be opened to allow the pressure surge or spike to be absorbed and captured by the central accumulator 38. Thereafter, the valve 40 can be closed to keep the energy captured within the accumulator 38 to be stored therein.

In the future, if the system 10 needs additional pressure rather than run the pump 20 to provide the higher pressure the valve 40 can be opened and the stored energy within the central accumulator 38 can be released to the system 10. This essentially provides a power boost to enable the system 10 to run at a higher pressure without expending any additional energy.

Similarly, when a force is pulling on the piston rod 30 the increase in pressure in the system 10 can be used in other portions of the system 10 particularly if the system 10 is coupled to additional actuators 12. For example, assume the rod 30 is connected to a robot arm that is holding a weight and gravity pulls on the arm and in turn the rod 30.

If higher pressure is needed elsewhere in the system 10, such as by another actuator (not illustrated) there is no need to run the pump 20 since the valves 14a-14d can be activated to supply the needed higher pressure. In such a situation, the system 10 can let the external force provided by gravity maintain the system 10 at the current desired pressure or provide an increase in pressure as described.

Although various systems can be used for various applications, when a high strength mobile system is needed a hydraulic system typically is preferred. Such systems can provide very high power transmission rates since they can parlay the power initially provided to the pump into energy increases thousands of times greater.

In addition to the unique arrangement of the system 10 as described above, applicant's contend that a hydraulic system with ten times the power density of non-hydraulic systems while achieving equivalent or even better efficiency and controllability than non-hydraulic systems is achievable according to the teachings of the present invention. More particularly, by combining the unique system 10 of the present invention with task flexibility at the planning and control levels significant opportunities exist for revolutionary improvement to hydraulic or similar systems.

For example, assume a robot (not illustrated) needs to lift, move and place an object. To accomplish this task, a designer would calculate a precise path in 3D space for the robot's end effector or "hand" to follow expending a significant amount of energy to move the object along the exact path without deviation.

The main constraint with existing approaches is the strict requirement that the robot follow the exact path. In reality, the only real requirements are that the robot lift the object and place it in the desired spot within an acceptable amount of time. The path taken (assuming obstacles are avoided) is not important.

This is a subtle but important distinction because it allows for potentially significant control flexibility. For example, the system could move the load along a path that allowed each cylinder to operate near peak efficiency.

Although allowing for this "task flexibility" seems relatively straight forward, it is quite complicated, particularly for mobile systems with complex robot arms, and requires a new cutting edge control system that has the ability to take numerous factors into account when automatically planning paths for the robot arms to follow. This type of new control system has been developed by one of the applicants herein and is known as a Qualitative State Plan (QSP) as described in more detail in "Robust Execution of Bipedal Walking Tasks from Biomechanical Principles", A. Hoffman, Ph.D. Thesis, MIT, 2005; "Exploiting Spatial and Temporal Flexibility for Plan Execution of Hybrid, Under-actuated Systems", A. Hoffman and B. Williams, AAAI 2006 and "Robust Execution of Temporally flexible Plans for Bipedal walking Devices", A. Hofmann and B. Williams, Computer Science and Artificial Intelligence Lab, MIT, the disclosures of which are hereby incorporated by reference.

Briefly, a QSP represents plans with temporal and spatial flexibility for hybrid discrete/continuous systems such as mobile robots, for example. It is to be understood, however, that a QSP can be applied to a variety of applications if desired.

A QSP consists of a sequence of qualitative states which correspond to discrete operating modes of the system. Each qualitative state has an associated set of continuous dynamic characteristics, a set of temporal and spatial goals, and a set of operating constraints.

Using the above example of a robot needing to lift, move and place an object, key state variables are positions of the hydraulic actuators. Temporal goals are useful for specifying that the state be in a goal region at an acceptable time. The execution system must check that the specified temporal constraints are reasonable; that they are consistent with the temporal limitations arising form the dynamics and actuation limits.

Transitions from one qualitative state to another are defined by events. Events represent temporal boundaries that can be restricted by temporal constraints. Goal regions for qualitative states define requirements for transition from one qualitative state to the next. The role of the QSP Executive is to exploit the flexibility in the QSP constraints in order to maximize optimization criteria such as energy efficiency, for example.

In analyzing a state space to determine feasible trajectories and optimal control policies, sets of feasible trajectories called "flow tubes" are computed which lead from one qualitative state to another. Multi-Parametric Programming, based on the concept of a Linear Quadratic Regulator, optimally forms state-space regions using convex polytopes and computes optimal control policies for each.

Applicants have utilized multi-parametric programming, combined with a novel temporal constraint compilation technique to compute flow tubes and optimal control policies for humanoid robots. In applying this technique, goal flexibility was used to compensate for disturbances (such as tripping of the robot, for example) and limited actuation.

In the present invention, a similar approach can be employed for the system 10 except goal flexibility is utilized to maximize energy efficiency as well. Here, the problem formulation for this technique consists of a QSP, a dynamic model and a cost function, all of which may vary, that minimized pressure drops across valves in order to maximize efficiency. The resulting control policy recognizes whether the current system state is valid for achieving the goals, and if so, generates a control and state trajectory from the current state to a goal state that minimizes costs and observes operational constraints.

Many of the features of the present invention along with additional information is provided in applicant's white paper entitled "Advanced Hydraulics for Mobile Robotics White Paper", vDoc ID 332, (pages 1-12) which is hereby incorporated by reference.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

We claim:

1. A mobile robot, comprising:
   at least one actuator member;
   at least one manipulator in operable communication with the at least one actuator member;
   a variable power source for providing power to the actuator member at a variety of levels; and
   means for operating the power source as desired at a first power level less than the maximum power level of the variable power source and increasing the power level of the power source to one or more levels higher than the first power level up to and including the maximum power level of the power source, the first power level being capable of providing enough power to the at least one actuator member for one or more tasks to be undertaken by the actuator member so that the power consumption of the mobile robot is limited for one or more operations yet enables the mobile robot to handle operations requiring more power as demanded while conserving energy of the mobile robot.

2. The mobile robot as defined in claim 1, wherein the mobile robot is a humanoid robot.

3. The mobile robot as defined in claim 1, wherein the mobile robot is capable of bipedal motion.

* * * * *